(12) United States Patent
Bilodeau et al.

(10) Patent No.: US 9,944,789 B2
(45) Date of Patent: Apr. 17, 2018

(54) POLYMERIC COMPOSITE MATERIALS AND METHODS OF MAKING THEM

(71) Applicant: University of Maine System Board of Trustees, Bangor, ME (US)

(72) Inventors: Michael A. Bilodeau, Brewer, ME (US); Jonathan Spender, Enfield, ME (US)

(73) Assignee: University of Maine System Board of Trustees, Bangor, ME (US)

( * ) Notice: Subject to any disclaimer, the term of this patent is extended or adjusted under 35 U.S.C. 154(b) by 0 days.

(21) Appl. No.: 14/894,120

(22) PCT Filed: May 30, 2014

(86) PCT No.: PCT/US2014/040268
§ 371 (c)(1),
(2) Date: Nov. 25, 2015

(87) PCT Pub. No.: WO2014/194215
PCT Pub. Date: Dec. 4, 2014

(65) Prior Publication Data
US 2016/0102201 A1   Apr. 14, 2016

Related U.S. Application Data

(60) Provisional application No. 61/829,395, filed on May 31, 2013.

(51) Int. Cl.
  C08L 67/04     (2006.01)
  C08L 67/02     (2006.01)
  (Continued)

(52) U.S. Cl.
  CPC .............. *C08L 67/04* (2013.01); *C08K 3/34* (2013.01); *C08K 3/346* (2013.01); *C08L 67/02* (2013.01);
  (Continued)

(58) Field of Classification Search
CPC .. C08L 67/04; C08L 1/02; C08L 67/02; C08L 2205/16; C08K 3/34; C08K 3/346; C08K 3/30; C09D 167/04
See application file for complete search history.

(56) References Cited

U.S. PATENT DOCUMENTS 6,337,131 B1 * 1/2002 Rupaner ................ B05D 5/061
                                                              428/212
6,632,894 B1 * 10/2003 McDaniel ............... B01J 21/16
                                                              502/118
(Continued)

FOREIGN PATENT DOCUMENTS

CN    103044911 A    4/2013
EP    0955323 A1     11/1999

OTHER PUBLICATIONS

Sigma-Aldrich ethylene glycol data sheet. Obtained from http://www.sigmaaldrich.com/catalog/product/sial/324558?lang=en&region=US on Dec. 28, 2016. No Author, No date.*
(Continued)

*Primary Examiner* — Michael A Salvitti
(74) *Attorney, Agent, or Firm* — Choate Hall & Stewart, LLP; Brian E. Reese; Margo R. Monroe

(57) ABSTRACT

Disclosed are processes for making polymeric composite materials and composite materials made from those processes the process comprising: providing a mixture, comprising: a liquid, a polymer precursor, and a dispersed-phase precursor; and subjecting the mixture to reaction conditions sufficient: to effect polymerization of the polymer precursor to produce a polymer and a reaction product; and to remove substantially all the liquid and reaction product from the mixture; wherein said reaction conditions comprise: pressure between about 10 millitorr and about 300 torr; and temperature: greater than or equal to the highest boiling point of the liquid and reaction product; less than the
(Continued)

decomposition temperature of the polymer; and less than the decomposition temperature of the dispersed-phase precursor.

22 Claims, 5 Drawing Sheets

(51) Int. Cl.
 *C08K 3/34* (2006.01)
 *C09D 167/04* (2006.01)

(52) U.S. Cl.
 CPC ........ *C09D 167/04* (2013.01); *C08L 2205/16* (2013.01)

(56) References Cited

U.S. PATENT DOCUMENTS

| | | | | |
|---|---|---|---|---|
| 2004/0135114 A1* | 7/2004 | Iyengar | ................... | H01F 1/447 252/62.52 |
| 2006/0141183 A1* | 6/2006 | Williamson | ........... | C08G 63/83 428/35.2 |
| 2006/0229406 A1* | 10/2006 | Silverman | ......... | B32B 17/10761 524/501 |
| 2006/0270806 A1* | 11/2006 | Hale | .......................... | C08J 5/18 525/439 |
| 2008/0315453 A1* | 12/2008 | Molitor | .................. | B82Y 30/00 264/209.1 |
| 2009/0286023 A1* | 11/2009 | Dobreski | ................ | B32B 27/08 428/34.8 |
| 2011/0104465 A1* | 5/2011 | Bilodeau | ............ | A01G 13/0268 428/219 |
| 2012/0065294 A1* | 3/2012 | Gajiwala | ................ | B82Y 30/00 523/351 |
| 2012/0114917 A1* | 5/2012 | Anderson | ................ | B05D 5/04 428/201 |
| 2016/0102201 A1* | 4/2016 | Bilodeau | .............. | C09D 167/04 524/733 |

OTHER PUBLICATIONS

International Search Report for PCT/US2014/040268, 4 pages (dated Jan. 22, 2015).
Written Opinion for PCT/US2014/040268, 6 pages (dated Jan. 22, 2015).

\* cited by examiner

POLYMERIC COMPOSITE MATERIALS AND METHODS OF MAKING THEM

This application is a 35 U.S.C. § 371 National Phase Entry Application of International Application No. PCT/2014/040268, filed May 30, 2014, and which claims the benefit under 35 U.S.C. § 119(e) of U.S. Provisional Application No. 61/829,395, filed May 31, 2013, the contents of both of which are incorporated herein by reference in their entirety.

TECHNICAL FIELD

The invention relates to processes for making polymeric composite materials and composite materials made from those processes.

BACKGROUND

Conventional methods of achieving well dispersed blends of inorganic material or cellulose fiber in a polymer matrix include simple mixing, high shear mixing (as developed in a Kady mill or Cowles mixer, or a high pressure homogenizer) or through the use of dispersants. With such methods, it can be difficult to disperse inorganic particles or fibrous materials uniformly throughout the polymer matrix. For example, the high water content and hydrophilic nature of nanocellulose makes it difficult to disperse this material in many polymeric systems, such as plastics and other hydrophobic composites. Additionally, it can be difficult with existing methods to produce a high solids dispersion of some materials. For example, it is difficult with existing methods to achieve greater than 3% solids content of nanocellulose in a water-based slurry and still have a slurry that flows or can be pumped. Similarly, it is difficult with existing methods to achieve greater than 70-72% solids content of inorganic materials in an aqueous slurry that is still pumpable.

SUMMARY

There remains a need for methods of making polymeric composite materials that permit a higher degree of dispersion of and/or a high concentration of a dispersed phase than is possible with existing methods.

In one aspect, the invention is directed to a method of producing a composite material having a matrix and a dispersed phase, comprising: (A) providing a mixture, comprising: (i) a liquid; (ii) a polymer precursor; and (iii) a dispersed-phase precursor; and (B) subjecting the mixture to reaction conditions sufficient: (i) to effect polymerization of the polymer precursor to produce a polymer and a reaction product; and (ii) to remove substantially all the liquid and reaction product from the mixture; wherein said reaction conditions comprise: (a) pressure between about 10 millitorr and about 300 torr; and (b) temperature: (i) greater than or equal to the highest boiling point of the liquid and reaction product; (ii) less than the decomposition temperature of the polymer; and (iii) less than the decomposition temperature of the dispersed-phase precursor; whereby the matrix comprises the polymer, and the dispersed phase comprises the dispersed-phase precursor dispersed within the matrix.

In one aspect, the invention is directed to a method comprising: producing a composite material having a matrix and a dispersed phase, comprising: (A) providing a mixture, comprising: (i) a liquid; (ii) a polymer precursor; and (iii) a dispersed-phase precursor; and (B) subjecting the mixture to reaction conditions sufficient: (i) to effect polymerization of the polymer precursor to produce a polymer and a reaction product; and (ii) to remove substantially all the liquid and reaction product from the mixture; wherein said reaction conditions comprise: (a) pressure between about 10 millitorr and about 300 torr; and (b) temperature: (i) greater than or equal to the highest boiling point of the liquid and reaction product; (ii) less than the decomposition temperature of the polymer; and (iii) less than the decomposition temperature of the dispersed-phase precursor; whereby the matrix comprises the polymer, and the dispersed phase comprises the dispersed-phase precursor dispersed within the matrix; and further comprising treating the composite material with a cross-linking agent.

In one aspect, the invention is directed to a composite material having a matrix and a dispersed phase, produced by a process comprising: (A) providing a mixture, comprising: (i) a liquid; (ii) a polymer precursor; and (iii) a dispersed-phase precursor; and (B) subjecting the mixture to reaction conditions sufficient: (i) to effect polymerization of the polymer precursor to produce a polymer and a reaction product; and (ii) to remove substantially all the liquid and reaction product from the mixture; wherein said reaction conditions comprise: (a) pressure between about 10 millitorr and about 300 torr; and (b) temperature: (i) greater than or equal to the highest boiling point of the liquid and reaction product; (ii) less than the decomposition temperature of the polymer; and (iii) less than the decomposition temperature of the dispersed-phase precursor; whereby the matrix comprises the polymer, and the dispersed phase comprises the dispersed-phase precursor dispersed within the matrix.

DETAILED DESCRIPTION

Figure 1:
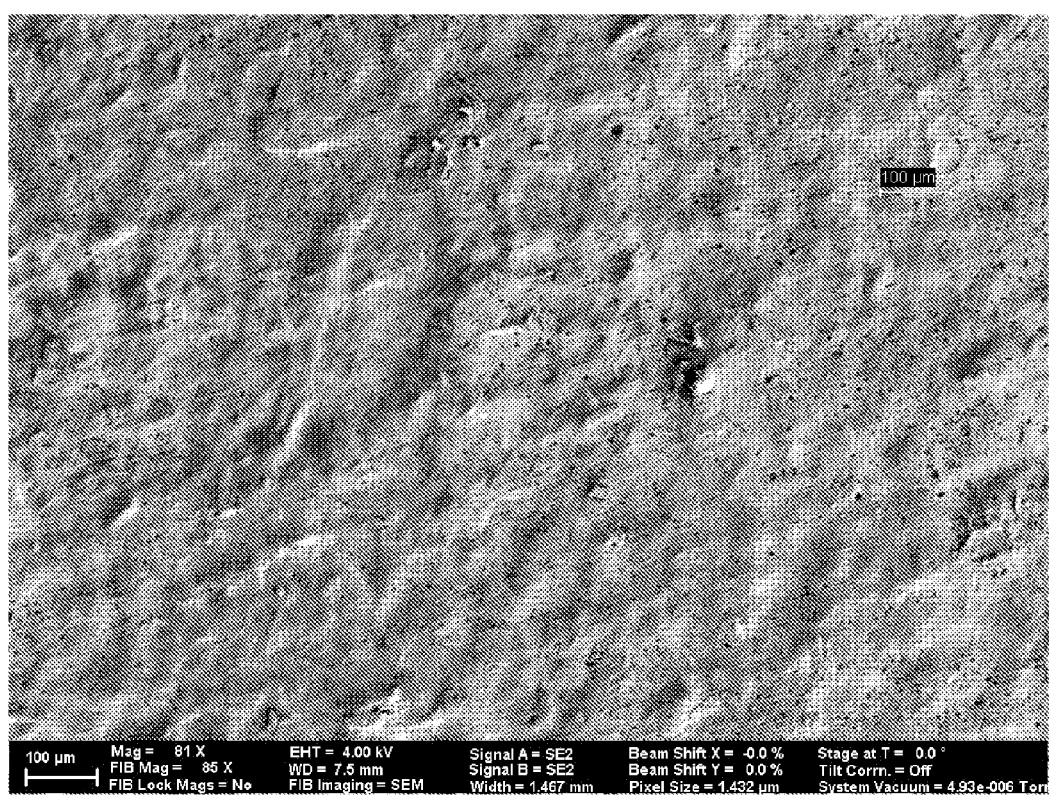
FIG. 1 is a low-magnification (81×) scanning electron microscopy (SEM) image of a surface of paper coated with coating A according to Example 2.
Figure 2:
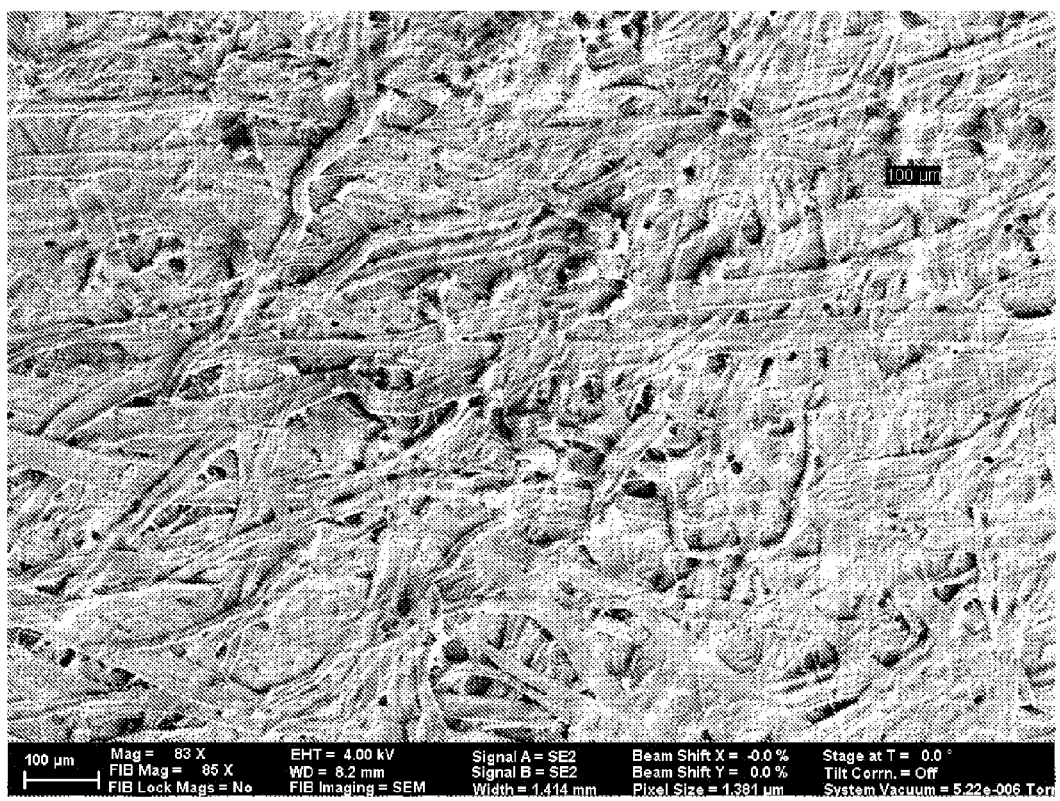
FIG. 2 is a low-magnification (81×) scanning electron microscopy (SEM) image of a surface of paper coated with coating B according to Example 2.
Figure 3:
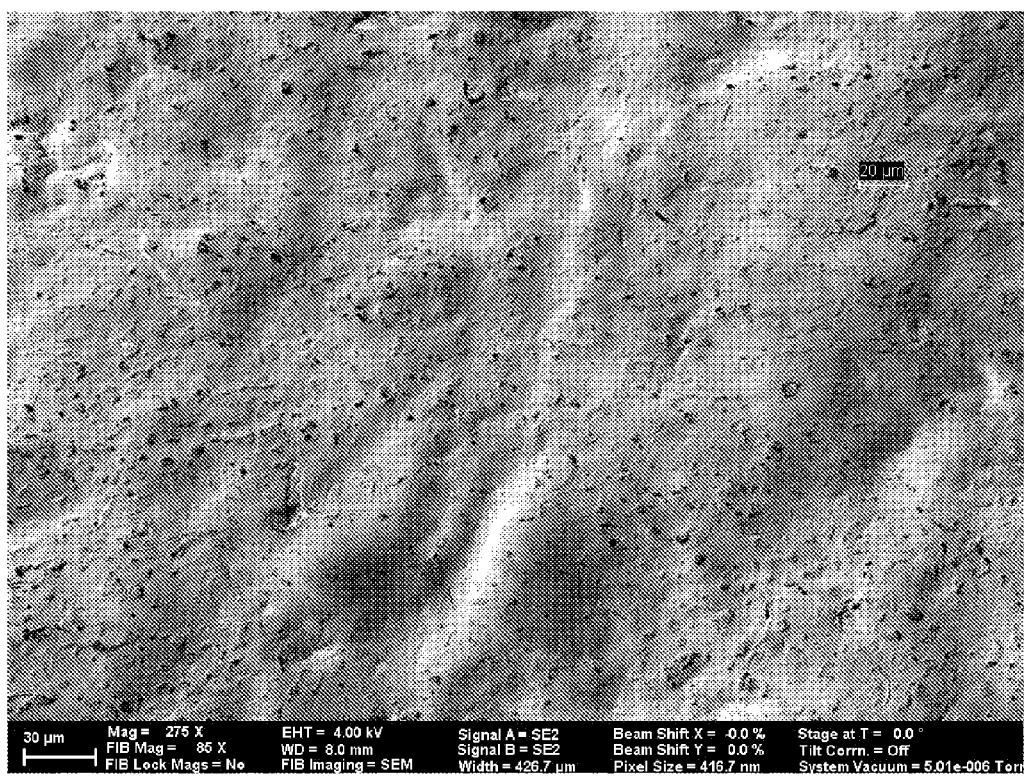
FIG. 3 is a high-magnification (183×) scanning electron microscopy (SEM) image of a surface of paper coated with coating A according to Example 2.
Figure 4:
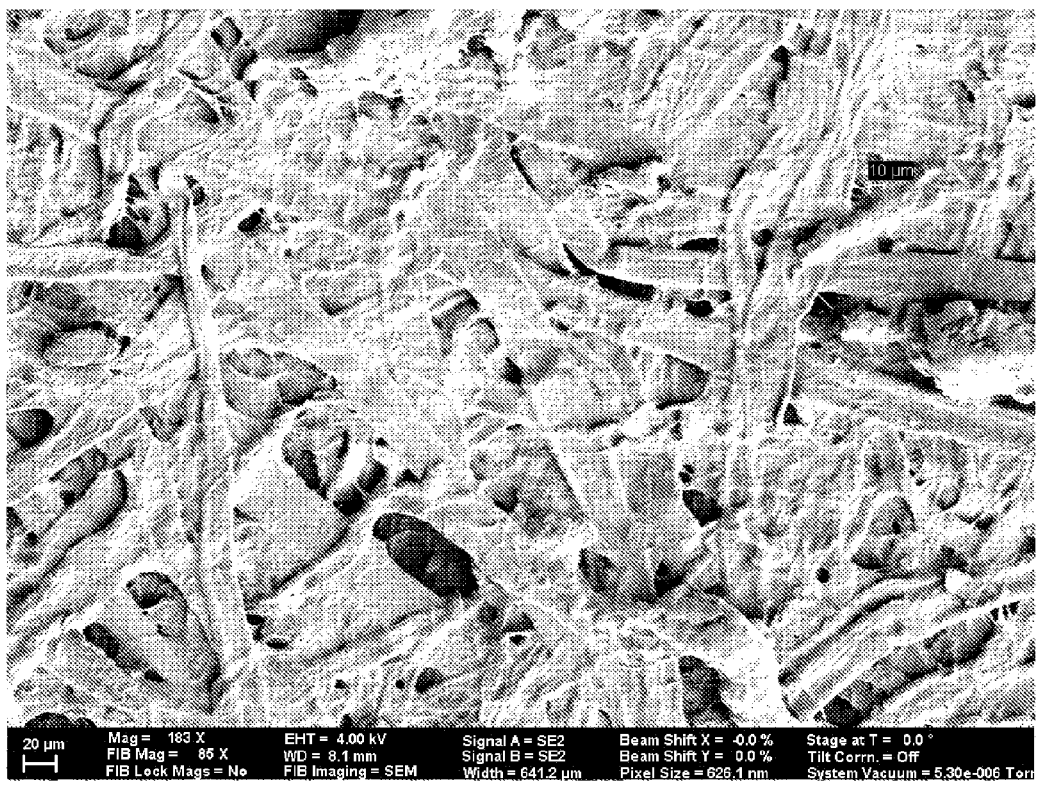
FIG. 4 is a high-magnification (183×) scanning electron microscopy (SEM) image of a surface of paper coated with coating B according to Example 2.

In some embodiments, the invention is directed to a method of producing a composite material having a matrix and a dispersed phase, comprising:
(A) providing a mixture, comprising:
  (i) a liquid;
  (ii) a polymer precursor; and
  (iii) a dispersed-phase precursor;
and
(B) subjecting the mixture to reaction conditions sufficient:
  (i) to effect polymerization of the polymer precursor to produce a polymer and a reaction product; and (ii) to remove substantially all the liquid and reaction product from the mixture; wherein said reaction conditions comprise:
(a) pressure between about 10 millitorr and about 300 torr; and
(b) temperature:
(i) greater than or equal to the highest boiling point of the liquid and reaction product;
(ii) less than the decomposition temperature of the polymer; and
(iii) less than the decomposition temperature of the dispersed-phase precursor;
whereby the matrix comprises the polymer, and the dispersed phase comprises the dispersed-phase precursor dispersed within the matrix.

The liquid can be any liquid suitable for use with the polymer precursor and dispersed-phase precursor under the conditions of the methods. The liquid can be used to aid in spreading the polymer precursor over large quantities of dispersed inorganic material prior to undergoing recation. Suitable liquides include water, waxes, fatty acids, polyamides, polyesters and the like. In some embodiments, the liquid is water.

The temperature refers to the temperature of the mixture. In some embodiments, the temperature is between about 70° C. and about 200° C. In some embodiments, the temperature is between about 120° C. and about 170° C. If a correlation between the temperature of the mixture and a different temperature (e.g., of the reaction vessel, of the atmosphere within the reaction vessel) is established, it is possible to monitor the temperature of the mixture using this surrogate temperature.

In some embodiments, the pressure is between about 10 millitorr and about 250 torr. In some embodiments, pressure is between about 10 millitorr and about 50 torr. In some embodiments, the pressure is between about 10 millitorr and about 1 torr.

In some embodiments, the temperature is between about 120° C. and about 170° C.; and the pressure is between about 10 millitorr and about 1 torr.

The boiling point of the liquid and reaction product refers to the boiling point at the pressure of the reaction conditions. When more than one liquid is present, it refers to the highest boiling point of any liquid present. Where appropriate, it refers to an azeotrope between two or more liquids. The reaction product will typically be a small molecule that is a liquid (under ambient conditions). In some embodiments, the reaction product is water. In some embodiments, the reaction product is methanol. In some embodiments, the reaction product is ethanol. In some embodiments, the reaction product is peroxide. In some embodiments, both the liquid and the reaction product are water.

The polymer precursor can be any substance (such as a monomer) capable of undergoing polymerization (e.g., via condensation) under the conditions of the methods of the invention.

In some embodiments, the polymer precursor is an organic acid. In some embodiments, the organic acid is lactic acid, itaconic acid or citric acid.

The dispersed-phase precursor can be any substance capable of being dispersed throughout the matrix under the conditions of the methods of the invention. For example, when the polymer precursor is an organic acid, substances that react with acids (e.g., basic substances such as calcium carbonate) are not suitable.

In some embodiments, the dispersed-phase precursor is an inorganic material. In some embodiments, the inorganic material is clay, talc, aluminum trihydrate, barium sulfate, a metal oxide or a silicate. Silicates include oxides (e.g., quartz family) and alumino-silicates (e.g., zeolites, benonites). In some embodiments, the inorganic material is clay. In some embodiments, the metal oxide is titanium dioxide or antimony oxide. In some embodiments, the silicate is an alumino-silicate.

In some embodiments, the dispersed-phase precursor is a fibrous material. In some embodiments, the fibrous material is wood fiber, flax, cotton, hemp, jute, nanocellulose, rayon, polyester, nylon, aramid fibers, rock wool, mineral wool, asbestos or fiberglass. In some embodiments, the fibrous material is nanocellulose.

In some embodiments, the invention is directed to a method of producing a composite material as described above, and further treating the composite material with a cross-linking agent.

In some embodiments, the cross-linking agent is ammonium zirconium carbonate, potassium zirconium carbonate, a glyoxal, an aliphatic epoxy resin, a melamine formaldehyde resin or a blocked isocyanate. In some embodiments, the cross-linking agent is ammonium zirconium carbonate, potassium zirconium carbonate or glyoxal.

In some embodiments, one or more additional components are blended with the mixture as the composite material is being formed, when the conditions of hydrophobicity, pH, viscosity, etc. are advantageous. This can be during polymerization, or after the polymerization reaction is essentially complete. Advantageously, this permits the addition of materials to the composites that would otherwise be very difficult to do or that are inherently incompatible with the composite in its final form (e.g., a hydrophilic cellulose fiber or hydrous clay into a hydrophobic, high viscosity polymer matrix).

In some embodiments, the mixture is blended with a light-scattering compound. In some embodiments, a light-scattering compound changes the light-scattering coefficient (s) of the material to which it is added by about 10 $cm^2/g$ or more. In some embodiments, the mixture is blended with a light-absorbing compound. In some embodiments, a light-absorbing compound changes the light-absorption coefficient (k) of the material to which it is added by about 0.1 $cm^2/g$ or more. The coefficients s and k are to be understood in terms of Kubelka-Munk theory as described in the Technical Association of Pulp and Paper Industries (TAPPI) Standard Practice T 1214 sp-12 "Interrelation of reflectance, reflectivity; TAPPI opacity; scattering and absorption."

In some embodiments, the mixture is blended with a fluorescent compound. In some embodiments, a fluorescent compound is an Optical Brightening Agent (OBA), i.e, a dye that absorbs energy in the uv portion of the electromagnetic spectrum and emits energy in the visible light portion. In some embodiments, an OBA increases the TAPPI Brightness (measured according to T-452) of the material to which it is added by about 0.2 points or more.

In some embodiments, the mixture is blended with a low-density material. A low-density material has a specific gravity less than the polymer of the composite. In some embodiments, a low-density material is hollow plastic pigment, vermiculite or pearlite.

The methods of the invention are capable of producing composite materials with a higher dispersed phase concentration, a lower viscosity and/or a higher degree of dispersion and/or distribution than is possible with existing methods.

In some embodiments, the composite material has a weight concentration of nanocellulose of 5%, 6%, 7%, 8%, 9%, 10% or higher (e.g., 15%, 20%, 25%, 30%, 40% or 50%). In such a material, the nanocellulose is well dispersed and the composite material is easily pumped. The high solids dispersion of nanocellulose presents an expanded opportunity to incorporate sufficient fractions of the material into paper coating, paints and composites to improve properties of these materials.

In addition to the high degree of particle dispersion in the composite, these embodiments also have the advantage of improved compatibility of nanocellulose when used as a reinforcing agent in hydrophobic systems such as high molecular weight polylactic acid, polyethylene, polypropylene, and other plastics and composites.

In some embodiments, the composite material has a weight concentration of clay of 75%, 77%, 79% or 80%. In such a material, the clay is well dispersed and the composite material is easily pumped.

In the case of a high aspect ratio clay and lactic acid, a composite produced using the methods of the invention results in a well dispersed, high solids material with oligomer chemically reacted onto the surface of the clay. The elevated temperature and low pressure conditions that drive off the water present in the solution of lactic acid, the clay slurry and the water formed during the condensation reaction also drives off the layer of water strongly absorbed onto the surface of the clay, exposing a highly reactive mineral surface that reacts with the lactic acid, forming a highly stable chemical bond between the oligomer and the surface of the clay. Evidence of this chemical bond is demonstrated by the improved solvent resistance of the polymeric composite compared to that of a simple admixture of the same polylactic acid oligomer and clay, as demonstrated in Example 1.

Binder migration in paper coatings, which takes place during the coating drying process, can lead to print quality problems. The chemical bond between the oligomer and the surface of clay particles in a composite produced by the methods of the invention immobilizes the composite within the coating layer when used as a coating binder. This minimizes binder migration during the drying of a coating and overcomes a limitation of conventional paper coating binders.

The high solids composite can be used as a binder in paints and coatings, replacing higher cost, non-biodegradable petroleum-based latex binders. The composite can also be used as a reinforcing agent in plastics and other composites. The composite can be cross-linked, using compounds such as AZC, KZC or glyoxal, further enhancing its binding and reinforcing properties.

The compositions produced by this method have been demonstrated to be useful as a coating for paper, wood, cloth, metal, plastic, film or foil. As shown in Example 2, the reaction between the polymer and dispersed phase material produces a composite that promotes improved coverage of the substrate compared to a composite made by simply blending the polymer and dispered phase materials together.

EXAMPLES

Example 1

This example demonstrates the improved chemical resistance of the composite material produced according to the methods of the invention.

Three composites, labeled Composite A-C, were produced according to the methods of the invention by blending a polymer precursor and various dispersed-phase precursors, in accordance with Table 1, and subjected to a temperature of 150° C. and a step-wise decrease in pressure from atmospheric pressure to 28 torr until substantially all of the water was removed. A fourth composite, Composite D, is a simple mixture of polylactic acid polymer blended, but not reacted with, talc.

TABLE 1

Compositions prior to methylene chloride extraction.

| Com-posite | Polymer Precursor | | Dispersed Phase Precursor | |
|---|---|---|---|---|
| | Identity | Amount (gms) | Identity | Amount (gms) |
| A | lactic acid | 5.623 | talc | 13.120 |
| B | lactic acid | 5.588 | dispersed clay | 13.038 |
| C | lactic acid | 4.778 | non-dispersed clay | 11.148 |
| D | lactic acid | 9.070 | talc | 9.072 |

The composites were then refluxed with methylene chloride for four hours and the composition of the resulting residual was determined analyzed by adapting Tappi standard method T211 om-85 "Ash in wood and pulp". The composition of the resulting material is presented in Table 2 below for each composite described in Table 1.

TABLE 2

Compositions following methylene chloride extraction.

| | Polymer Precursor | | Dispersed Phase Precursor | | |
|---|---|---|---|---|---|
| Composite | Identity | Amount (gms) | Identity | Amount (gms) | Polymer Extracted |
| A | lactic acid | 1.042 | talc | 12.800 | 81% |
| B | lactic acid | 1.124 | dispersed clay | 13.020 | 80% |
| C | lactic acid | 1.321 | non-dispersed clay | 11.102 | 72% |
| D | lactic acid | 0.000 | talc | 8.412 | 100% |

Polylactic acid is soluble in methylene chloride. As shown in Table 2, Composites A, B and C, produced according to the methods of the invention, demonstrated a significant resistance to dissolution by the methylene chloride solvent compared to Composite D, a mixture of polylactic acid polymer blended, but not reacted with, talc.

Example 2

This example demonstrates the improved substrate coverage for the composite material of the invention.

Two coatings of similar composition, designated A and B, were prepared. Coating A was prepared according to the methods of the invention (labeled as "reacted" in Table 3, below). Coating B is a blended (non-reacted) composition. The composition of the coatings is shown in Table 3.

TABLE 3

Coating Compositions.

| | | Polymer Precursor | | Dispersed Phase Precursor | |
|---|---|---|---|---|---|
| Coating | Method | Identity | % wt | Identity | % wt |
| A | Reacted | lactic acid | 96 | nanocellulose | 4 |
| B | Blended | lactic acid | 96 | nanocellulose | 4 |

A paper coating substrate with a nominal basis weight of 32 grams per $m^2$, typical of light weight packaging papers, was coated with coatings A and B using a standard laboratory coating draw-down method. The coatings were applied at a coatweight of approximately 10 grams per $m^2$, as determined gravimetrically.

Scanning electron microscope images were taken of the coated paper surfaces as shown in FIG. 1-4. The microphotographs clearly show the improved substrate coverage for the composition of the invention compared to the similar composition which was blended.

Example 3

A flooded nip size press is often used to apply sizing or a surface coating to a broad range of paper grades, including printing and writing and packaging grades. One of the benefits of this coating application is to seal the surface of the paper, thereby improving print quality and/or reducing air porosity.

This type of coating application method is limited to low viscosity coating formulations (less than 700 cps Brookfield viscosity) to prevent coating rejection at the nip and poor coating coverage. For starch-based coating formulations, this limits coating solids to 15% solids or less and, therefore, the level of coat weight that can be applied to the surface of the paper.

A nominal 38 gsm uncoated paper, made from bleached chemical pulp, was coated on the pilot paper machine at the University of Maine using a conventional, inclined, flooded nip size press. A typical 96 wt % starch and 4 wt % polyvinyl alcohol coating formulation at 15% solids was used as the control coating and compared to a coating containing a poly-lactic acid (PLA)/Clay composite, made by the method of the invention, at 54% solids. Both coating formulations exhibited similar viscosities and both performed well on the coater. As shown in Table 4, the results of the paper testing shows that the PLA/Clay composite was much more effective in developing low air permeability compared to the standard starch/PVA formulation.

TABLE 4

Coated Paper.

| Sample | Gurley Porosity, sec (for 100 cc air) | Coating % solids |
|---|---|---|
| Uncoated Base Paper | 17.3 | N/A |
| Base Paper with Control Coating | 21.8 | 15.1% |
| Base Paper with PLA/Clay coating | 222 | 54.1% |

Example 4

A release base paper grade was produced using the pilot paper machine at the University of Maine with a nominal basis weight of 80 gm/$m^2$. The fiber furnish was 70% northern bleached hardwood kraft and 30% northern bleached softwood kraft, refined to a freeness of 200 ml Canadian Standard Freeness. Cellulose nanofibrils and cooked corn starch were blended together and added to the furnish at a rate of 200 lb/ton of fiber. The pH of the wet end was maintained at approximately 7 and no filler was added to the furnish.

An inclined size press was used to apply two separate size press coating formulations to the basepaper. The first formation was a blend of 96 wt % starch and 4 wt % polyvinyl alcohol and the second coating formulation was a 70% PLA and 30% Clay novel composite material produced according to the invention. Both sets of papers were then calendared using a hot, soft nip calendar with 3000 pli of pressure and a roll surface temperature of 200 F.

Both papers were then silicone coated with 0.71 lb of silicone/3000 $ft^2$ of paper. A test ink was applied to the surface of the paper and the unabsorbed ink wiped with a cloth. The ink that penetrated into the structure of the paper remained leaving a dark stain pattern in the test sample.

Figure 5A:
FIG. 5A is an image of paper coated with a starch and polyvinyl alcohol coating and a silicone coating, after stain testing, according to Example 4
Figure 5B:
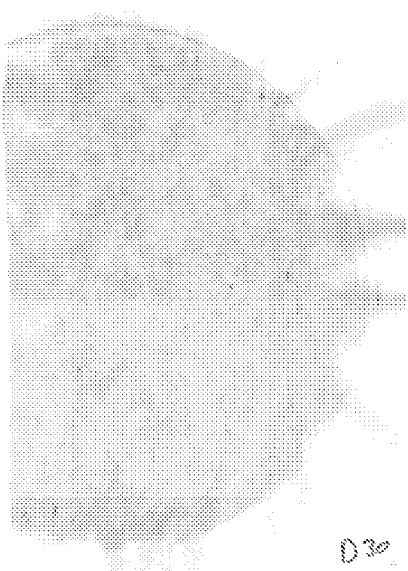
FIG. 5B is an image of paper coated with a PLA/Clay composite coating and a silicone coating, after stain testing, according to Example 4.

FIG. 5A is an image of the starch/PVA coated samples after the test stain was applied to the surface and wiped clean. FIG. 5B is an image of the PLA/Clay coated paper sample after the ink stain test. A comparison of the two test samples shows the improved barrier properties for the PLA/Clay composite coated sample compared to the starch/PVA coated paper.

What is claimed is:

1. A method of producing a composite material having a matrix and a dispersed phase, comprising:
    (A) providing a mixture, comprising:
        (i) a liquid;
        (ii) a polymer precursor; and
        (iii) a dispersed-phase precursor;
    and
    (B) subjecting the mixture to reaction conditions sufficient:
        (i) to effect polymerization of the polymer precursor to produce a polymer and a reaction product; and
        (ii) to remove substantially all the liquid and reaction product from the mixture;
    wherein said reaction conditions comprise:
        (a) pressure between about 10 millitorr and about 300 torr; and
        (b) temperature, wherein the temperature is between about 70° C. and about 200° C.
        whereby the matrix comprises the polymer, and the dispersed phase comprises the dispersed-phase precursor dispersed within the matrix.

2. The method according to claim 1, wherein the pressure is between about 10 millitorr and about 250 torr.

3. The method according to claim 1, wherein:
    the temperature is between about 120° C. and about 170° C.; and
    the pressure is between about 10 millitorr and about 1 torr.

4. The method of claim 1, wherein the polymer precursor comprises an organic acid.

5. The method according to claim 4, wherein the organic acid is lactic acid, itaconic acid or citric acid.

6. The method of claim 1, wherein the dispersed-phase precursor comprises an inorganic material.

7. The method according to claim 6, wherein the inorganic material comprises clay, talc, aluminum trihydrate, barium sulfate, a metal oxide or a silicate.

8. The method according to claim 6, wherein the inorganic material comprises clay.

9. The method according to claim 7, wherein the metal oxide is titanium dioxide or antimony oxide.

10. The method according to claim 7, wherein the silicate is an alumino-silicate.

11. The method claim 1, wherein the dispersed-phase precursor comprises a fibrous material.

12. The method according to claim 11, wherein the fibrous material comprises wood fiber, flax, cotton, hemp, jute, nanocellulose, rayon, polyester, nylon, aramid fibers, rock wool, mineral wool, asbestos or fiberglass.

13. The method according to claim 11, wherein the fibrous material comprises nanocellulose.

14. The method of claim 1, wherein the liquid comprises water.

15. The method of claim 1, wherein the reaction product is water.

16. The method of claim 1, further comprising treating the composite material with a cross-linking agent.

17. The method according to claim 16, wherein the cross-linking agent comprises ammonium zirconium carbonate, potassium zirconium carbonate, a glyoxal, an aliphatic epoxy resin, a melamine formaldehyde resin or a blocked isocyanate.

18. The method according to claim 16, wherein the cross-linking agent comprises ammonium zirconium carbonate, potassium zirconium carbonate, or glyoxal.

19. The method of claim 1, further comprising blending the mixture with a light-scattering compound.

20. The method of claim 1, further comprising blending the mixture with a light-absorbing compound.

21. The method of claim 1, further comprising blending the mixture with a fluorescent compound.

22. The method of claim 1, further comprising blending the mixture with low-density material.

\* \* \* \* \*